United States Patent
Pasquier et al.

(10) Patent No.: US 9,495,793 B2
(45) Date of Patent: Nov. 15, 2016

(54) METHOD AND DEVICE FOR GENERATING AN IMAGE VIEW FOR 3D DISPLAY

(75) Inventors: Laurent Pasquier, Asnieres-sur-seine (FR); Yves Mathieu, Yerres (FR); Jean Gobert, Alfortville (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 683 days.

(21) Appl. No.: 13/993,368

(22) PCT Filed: Dec. 21, 2011

(86) PCT No.: PCT/EP2011/073673
§ 371 (c)(1),
(2), (4) Date: Dec. 11, 2013

(87) PCT Pub. No.: WO2012/089595
PCT Pub. Date: Jul. 5, 2012

(65) Prior Publication Data
US 2014/0293018 A1    Oct. 2, 2014

Related U.S. Application Data

(60) Provisional application No. 61/438,764, filed on Feb. 2, 2011.

(30) Foreign Application Priority Data

Dec. 28, 2010    (EP) .................................. 10306528

(51) Int. Cl.
*G06T 15/08*    (2011.01)
*G06T 15/20*    (2011.01)
(Continued)

(52) U.S. Cl.
CPC ............... *G06T 15/08* (2013.01); *G06T 15/04* (2013.01); *G06T 15/205* (2013.01); *H04N 13/0011* (2013.01)

(58) Field of Classification Search
CPC ..................... G06T 15/04; G06T 15/08; G06T 15/205; H04N 13/0011
(Continued)

(56) References Cited

U.S. PATENT DOCUMENTS 6,466,207 B1 * 10/2002 Gortler ................. G06T 15/205
345/419
7,242,408 B1 * 7/2007 Dunn ...................... G06T 15/04
345/426
(Continued)

FOREIGN PATENT DOCUMENTS

WO    2009027691 A1    3/2009

OTHER PUBLICATIONS

International Search Report issued in corresponding International application No. PCT/EP2011/073673, date of mailing May 7, 2012.
(Continued)

*Primary Examiner* — Francis G Geroleo
(74) *Attorney, Agent, or Firm* — Patent Portfolio Builders PLLC

(57) ABSTRACT

There is described a method for generating an image view from at least one input image for a 3D display using a backward processing enabling post processing for handling holes in the image view.

14 Claims, 13 Drawing Sheets

(51) Int. Cl.
*H04N 13/00* (2006.01)
*G06T 15/04* (2011.01)

(58) Field of Classification Search
USPC .......................................................... 348/51
See application file for complete search history.

(56) References Cited

U.S. PATENT DOCUMENTS

| | | | | |
|---|---|---|---|---|
| 2006/0028489 | A1* | 2/2006 | Uyttendaele | G06T 15/205 345/646 |
| 2006/0066612 | A1 | 3/2006 | Yang et al. | |
| 2009/0207179 | A1* | 8/2009 | Huang | G06T 15/205 345/505 |
| 2010/0091093 | A1* | 4/2010 | Robinson | G09G 3/003 348/47 |
| 2011/0058021 | A1* | 3/2011 | Chen | G06T 15/205 348/46 |
| 2011/0122126 | A1* | 5/2011 | Han | H04N 13/0454 345/419 |
| 2011/0157160 | A1* | 6/2011 | Ushiki | H04N 13/0275 345/419 |
| 2012/0162193 | A1* | 6/2012 | Bae | H04N 13/0011 345/419 |

OTHER PUBLICATIONS

Morvan, Yannick, "Acquisition, Compression and Rendering of Depth and Texture for Multi-View Video," http://vca.ele.tue.nl, Apr. 30, 2009, pp. 93-108, XP002637888, ISBN: 978-90-386-1682-7.

Tzovaras, Dimitrios et al., "Disparity Field and Depth Map Coding for Multiview 3D Image Generation," Signal Processing: Image Communication 11 (1998) pp. 205-230.

Kauff, P. et al., Depth Map Creation and Image-Based Rendering for Advanced 3DTV services providing Interoperability and Scalability, Signal Processing: Image Communication 22 (2007) pp. 217-234.

Berretty, R-P. M. et al., "Real Time Rendering for Multiview Autostereoscopic Displays," Stereoscopic Displays and Virtual Reality Systems XIII, Proc. of SPIE-IS&T Electronic Imaging, SPIE vol. 6055, Jan. 30, 2006.

Oklobdzija, Vojin G., "An Algorithmic and Novel Design of a Leading Zero Detector Circuit: Comparison with Logic Synthesis," IEEE Transactions on Very Large Scale Integration (VLSI) Systems, vol. 2, No. 1, Mar. 1994.

* cited by examiner

METHOD AND DEVICE FOR GENERATING AN IMAGE VIEW FOR 3D DISPLAY

TECHNICAL FIELD

The present invention relates to methods and devices for generating image views for 3D ("three dimensions") display.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

One approach for 3D display is to display a multiplicity of image views in spatially shifted positions, so that the user's left and right eyes see different views, giving an impression of depth by stereoscopy.

FIG. 1 is a schematic illustration of the stereoscopic effect on a 3D display. A viewer 10 watches a 3D display 11. The 3D display has vertical elements 12 enabling displaying different columns of different image views. In the illustration of FIG. 1, the vertical element can display five columns of five respective image views at different angles namely a central view C 13, an extreme left view L1 14, a near left view L2 15, an extreme right view R1 16, and a near right view R2 17. Thus, depending on its position with respect to the 3D screen, the viewer can see simultaneously two images respectively with each eye, giving him/her an impressing of depth.

In some applications, a 3D format for an image is a format combining texture information and depth information. That format provides a 2D view of the scene represented by the image (texture/colour information) and a depth map that is used by the display device for computing lateral views (e.g. extreme/near left, extreme/near right).

Representations of the texture and depth information are referred to as maps. The texture map is a bitmap giving colours for all of its pixels, while the depth map gives their depth information. The texture map can be used directly for the central view. Both the texture map and the depth map are needed for computing the side views.

For obtaining a side view having an angle α (alpha) with the central view, each pixel of the central view may be horizontally shifted by an amount called "disparity". Said amount (disparity) may typically be computed through a linear function of the depth of the pixel and the angle alpha of view.

The operation associating the texture of a pixel to a corresponding pixel in a view is called projection.

In a first approach, referred to as "forward processing", one starts from a pixel in the input image to generate the corresponding projected pixel in a view. In a second approach, referred to as "backward processing", one starts from a pixel of a view to be generated (e.g. a left view) and finds the corresponding pixel (that is to be used in the view) in the input image.

In the forward processing approach, computation of view's pixel values following input pixel and depth values is not accurate. Pixels are only projected at an integer position as depth values are integer.

In the forward processing approach, pixels positions in the view may never be assigned, leaving a "hole" ("de-occlusion"), or they may be assigned several times ("occlusion").

Post processing is needed to handle the occlusion and/or de-occlusion. For this purpose, after the projection, all positions in a view must be examined. Holes are typically filled by relevant information, while multiple assignments are typically solved by keeping only the assignments corresponding to the most foreground pixels occluding the background. This leads to a rather complex processing.

Typically, the handling of occlusions and/or de-occlusions is complex and may also induce approximation artefacts.

In the backward approach, the depth of the pixel in the input image that will be projected onto a pixel in the image view is not known. An approximation is typically used. This approximation may lead to artefacts.

One advantage of the backward approach is that all pixels in the views are visited by construction so that no holes are left. Thus, post processing due to de-occlusion is not needed.

SUMMARY

To address at least some of the disadvantages of the prior art, a first aspect of the present invention relates to a method of generating an image view from at least one input image for display on a 3D display, wherein each input image is associated with a texture map and a depth map, wherein the image view is generated at least based on a texture map and a depth map associated with the input image, wherein each pixel of the input image is associated with a texture value of the texture map and to a depth value of the depth map, wherein an associating function associates pixels of the input image to pixels of the image view, the associating function having at least the depth value of the pixel of the input image as a first parameter.

The method comprises the following steps, performed for each current pixel in the image view to be generated:
  defining a set of pixel candidates in the input image, the set of pixel candidates comprising pixel candidates associated with the current pixel in the image view through the associating function, and
  for at least one current pixel of the set of pixel candidates:
    calculating a potential depth value $D^*$ with which the associating function would associate to the said current pixel of the input image to the current pixel candidate,
    comparing the calculated potential depth value $D^*$ to an actual depth value D associated with the said current pixel of the input image, and
    associating a texture value to the current pixel of the image view, based on a result of the comparison, said texture value being based on the texture value of the current pixel candidate.

Embodiments of the invention may decrease the complexity of the backward approach as implemented in the prior art.

Embodiments are applicable in any general 3D scenario, when different pictures are shown to the different eyes using other available techniques (e.g. using glasses and polarization/switching as in 3D cinema).

Some embodiments of the invention are suitable for a hardware oriented implementation.

A second aspect of the present invention relates to a computer program product for performing the steps of a method according to the first aspect.

A third aspect of the present invention relates to a device for performing the steps of a method according to the first aspect.

A fourth aspect of the present invention relates to a display comprising a device according to the third aspect.

A fifth aspect of the invention relates to an electronic apparatus comprising a display according to the fourth aspect.

BRIEF DESCRIPTION OF THE DRAWINGS

Embodiments of the invention are illustrated by way of example, and not by way of limitation, in the figures of the accompanying drawings, in which like reference numerals refer to similar elements and in which.

DESCRIPTION OF EMBODIMENTS

Figure 1:
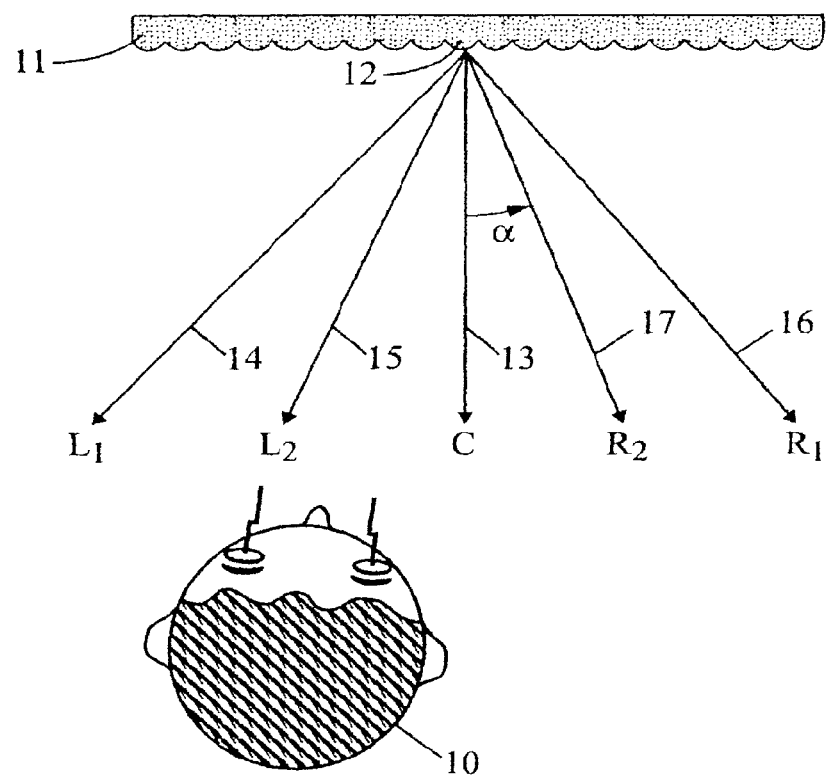
FIG. 1 is a schematic illustration of the stereoscopic effect on a 3D display.
Figure 2:
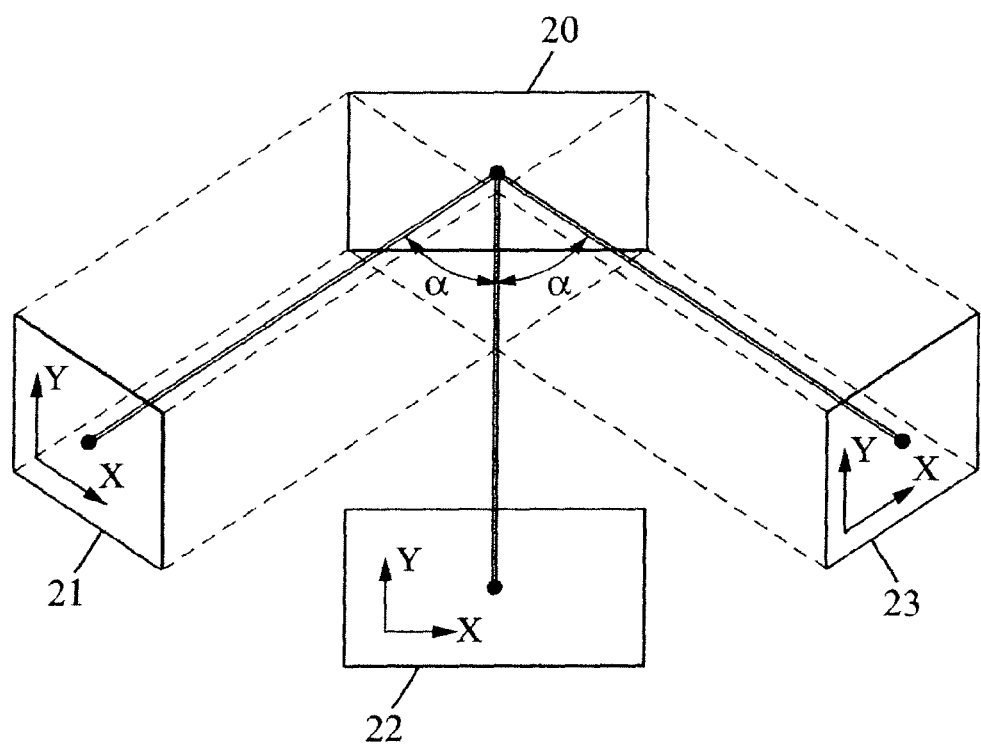
FIG. 2 a schematic illustration of a 3D display that simultaneously displays three views of an input image according to embodiments.
Figure 2:
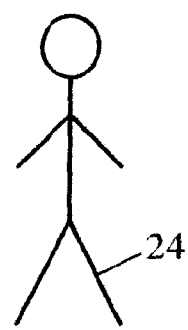

FIG. 2 illustrates a 3D display 20 that simultaneously displays three views 21, 22, 23 of an input image. The image view 22 is the central view; it corresponds to the initial texture map of the input image from which the three views are generated. The central view is intended to be viewable directly in front of the display. The other image views 21 and 23 correspond to side views of the initial texture map of the input image. The side views are intended to be viewable with an angle α with respect to the central view, namely respectively slightly shifted to the left and to the right of the central image view.

For defining location of the pixels in each image view and in the input image, a coordinate system X, Y is associated with the image views and the input image. The abscissa axis X corresponds to the horizontal direction for a viewer 24, and the ordinates axis Y corresponds to the vertical direction for the viewer.

Figure 3:
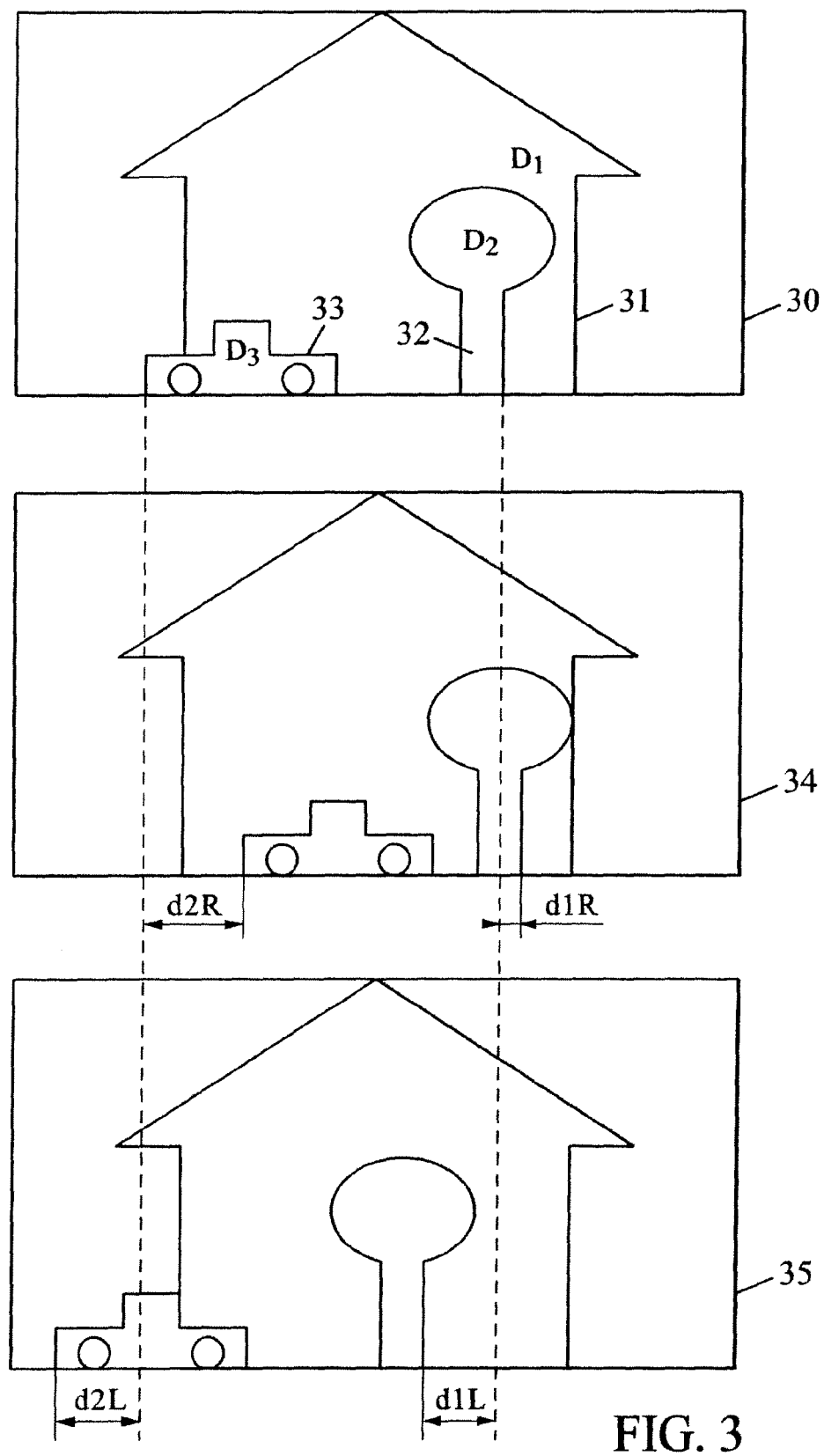
FIG. 3 is a schematic illustration of the processing pixels for generating side image views according to embodiments.

FIG. 3 illustrates how the pixels are processed for generating the side image views 21 and 23 according to embodiments. As already indicated above, the central image view 22 corresponds to a texture map of the initial input image.

Image 30 corresponds to the texture map of the input image. It represents a house 31, a tree 32 and a car 33. The car is in the foreground, the tree in the middle and the house in the background. The input image is stored in a memory of an image processing device. In the device, the input image is represented by two arrays of data or "maps": a texture map storing the value of the colour (or texture) of each pixel in the image, and a depth map storing the depth value of each pixel in the image. The depth values give information on the plane to which the objects belong: e.g. background, middle, or foreground.

Schematically, in the image 30 of FIG. 3, the pixels representing the car have a depth value D3 which is inferior to the depth value D2 of the pixels representing the tree, and the pixels representing the house have a depth value D1 inferior to D2 and D3. Other conventions may be envisaged, for example the scale may be reversed.

The image view 34 is generated based on the input image. The image view 34 is intended to be displayed on the 3D display, shifted by an angle α with respect to the central view 30, to the left for the viewer (position corresponding to the image view 21 in FIG. 2).

The house, the tree and the car in the image are shifted according to a function that takes into account the shifting angle and the depth of the pixel representing each object. For example, the function may be a linear function of the depth and the shifting angle as follows:

$$x=F(x')=x'+d \text{ with } d=A\alpha+BD,$$

wherein x represents the position of a pixel in the image view (with the coordinates system X, Y), x' the position of the pixel in the input image (with the coordinates system X, Y), D the depth of the pixel in the input image, and α the angle between the image view and the central image view on the 3D display. Parameters A and B are proportional coefficients for the setting of the image view. The function F is referred to as the "projecting" function. The parameter d is called "disparity" and corresponds to the shifting of each pixel of the input image for obtaining the corresponding pixel in the image view.

In the image views, 34 and 35, the tree and the car are not shifted with respect to their initial position by the same distance (disparity). The disparities d1R and d1L for the tree are respectively inferior to the disparities d2R and d2L of the car. This is due to the fact that the car and the tree do not have the same depth value in the initial image. (Here, it is assumed that image views 34 and 35 have the same shifting angle α but in opposed directions (left and right as shown on FIG. 2).)

A method according to embodiments of the invention is detailed below, with reference to FIG. 4 and the flowchart of FIG. 5.

Figure 4:
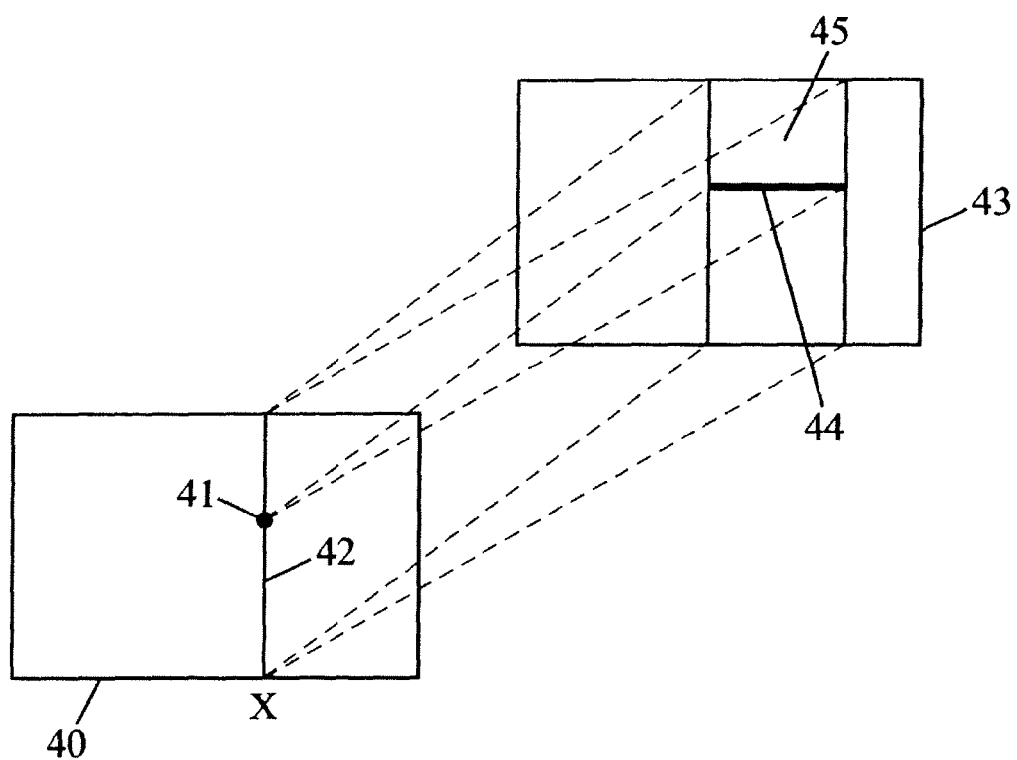
FIG. 4 is a schematic illustration of the generation of an image view according to embodiments.

FIG. 4 illustrates the generation of an image view according to embodiments. This figure shows an image view 40 to be completed by assigning to each pixel 41 a texture (colour) value in an associated texture map (not represented). To that purpose, each pixel of a vertical line 42 of the image view is considered.

In a step S500, an input image 43 is received. The image view 40 will be completed based on that input image.

Embodiments are contemplated wherein an input comprises two views (for example with angles of view α and −α), each of them being associated to a respective depth map and a respective texture map.

In such embodiments, creation of views may be still needed, even if two views are already provided. A first reason may be that the display supports more than two views. A second reason may be that the display already supports two views, but resizing is required (resizing an image in width and height may also require resizing in depth to avoid disproportioned depth effects for viewer).

In such embodiments, a selection of one view is also performed in order to generate a new view of angle β. The selection may consist in taking the view that is on the same side than the view to be generated (i.e. if the view to generate is on the left, select the left view of the input).

Having an input with two views with two textures and two associated depth maps may help in case of de-occlusion to fill the hole with correct pixels.

Figure 5:
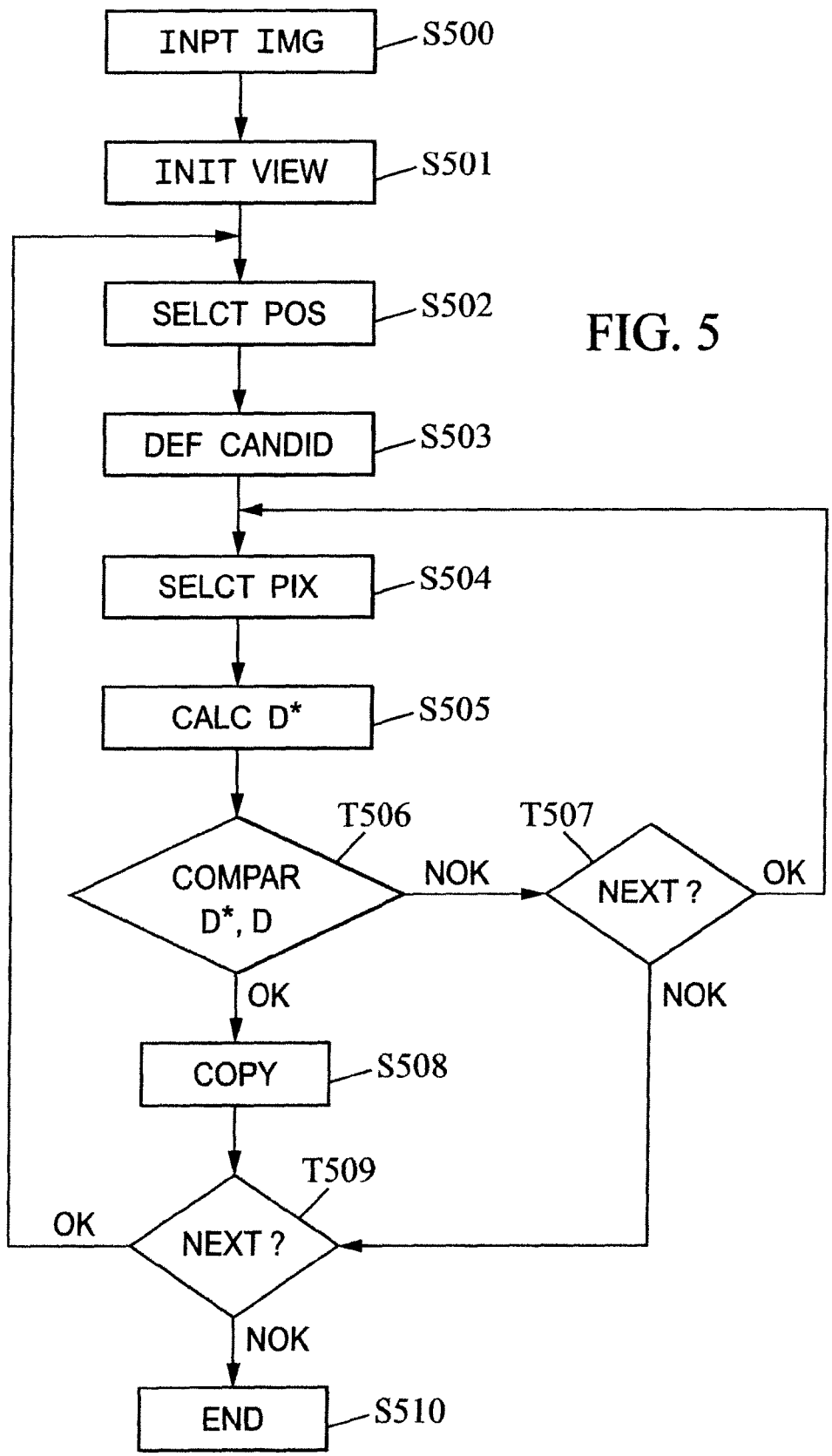
FIGS. 5-8 are flow charts illustrating steps of a method according to embodiments

Back to FIG. 5, in step S501, the process is initiated by allocating a memory space for storing the image view 40 to be created. Notably, a texture map is initialized.

In step S502, a current pixel in the image view is selected, for example, the position corresponding to the pixel 41.

In step S503, a set of pixel candidates 44 in the input image is defined, based on a projecting function that takes as input parameters a depth value and an intended angle of display of the image view. For example, the set of pixel candidates is defined using the maximum depth value in the depth map associated with the input image 43.

If we consider only horizontal shifting for creating the image view 40, the set of pixel candidates 44 corresponds to a horizontal line in the input image. The pixels candidates for the pixels in the line 42 of the image view are then comprised in a vertical band 45 in the input image.

Using the linear function F discussed above, the abscissa of the pixels in the set of pixel candidates may be defined by:

$$x-A\alpha-BD_{max} \leq x' \leq x-A\alpha-BD_{min},$$

where x' corresponds to the abscissa of the pixels in the input image, x is the abscissa of the current pixel in the image view, $D_{max}$ is the maximum depth value in the depth map associated with the input image, $D_{min}$ is the minimum depth value in the depth map associated with the input image, and where B is a positive parameter.

Alternatively, if we consider that the disparity is inferior to a maximum value $d_{max}$, the set of pixel candidates may also be defined by:

$$x-d_{max} \leq x' \leq x+d_{max}.$$

Each pixel candidate of the set of pixel candidates may have its texture value assigned to the current pixel through the projecting function F depending on its depth value.

Returning to the process, when the set of pixel candidates is defined, a current pixel candidate in the set of pixel candidates is selected in step S504.

Then, a potential depth value is calculated for the current pixel candidate during step S505. The potential depth value corresponds to a fictive depth value that would be suitable for the current pixel candidate for being projected on the current pixel of the image view.

The potential depth value is calculated as follows:

$$D^* = \frac{x - x' - A\alpha}{B}.$$

With such a depth value D* we have F(x)=x', i.e. the current pixel candidate is projected on the current pixel of the' input image.

Once the potential depth value is calculated, it is compared to the actual depth value associated with the current pixel candidate in the depth map, during step T506.

For example, the comparison between the potential depth value D*(x') and the actual depth value D(x') is done by determining the sign of their difference. An intersection is detected when signs differ in adjacent pixels of the texture.

Figure 15:
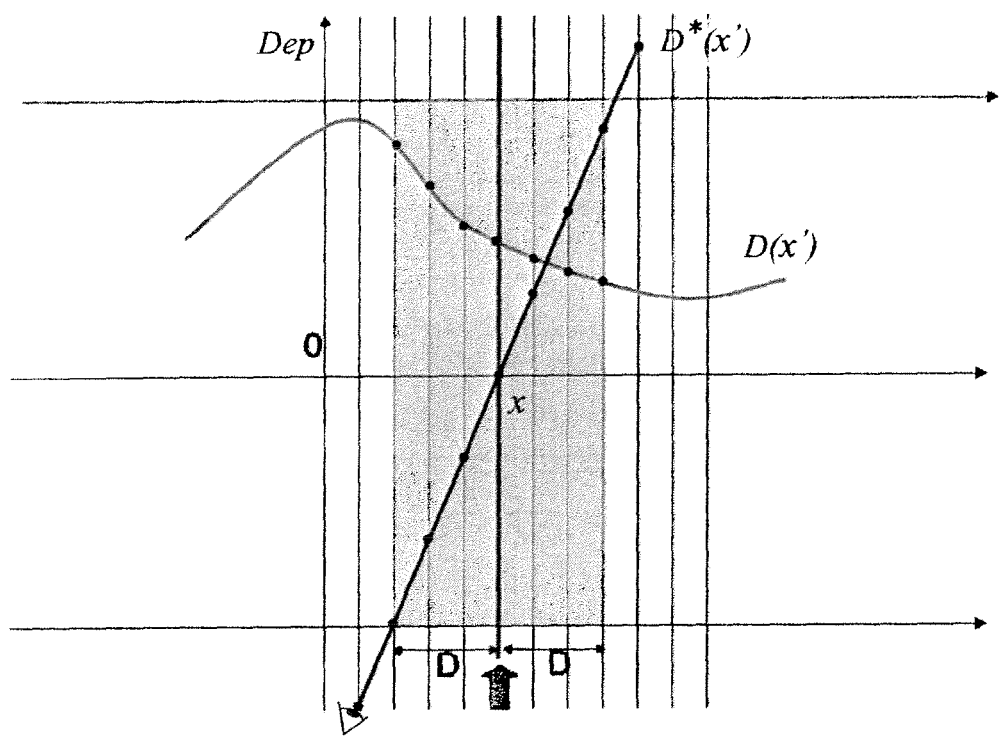
Figure 16:
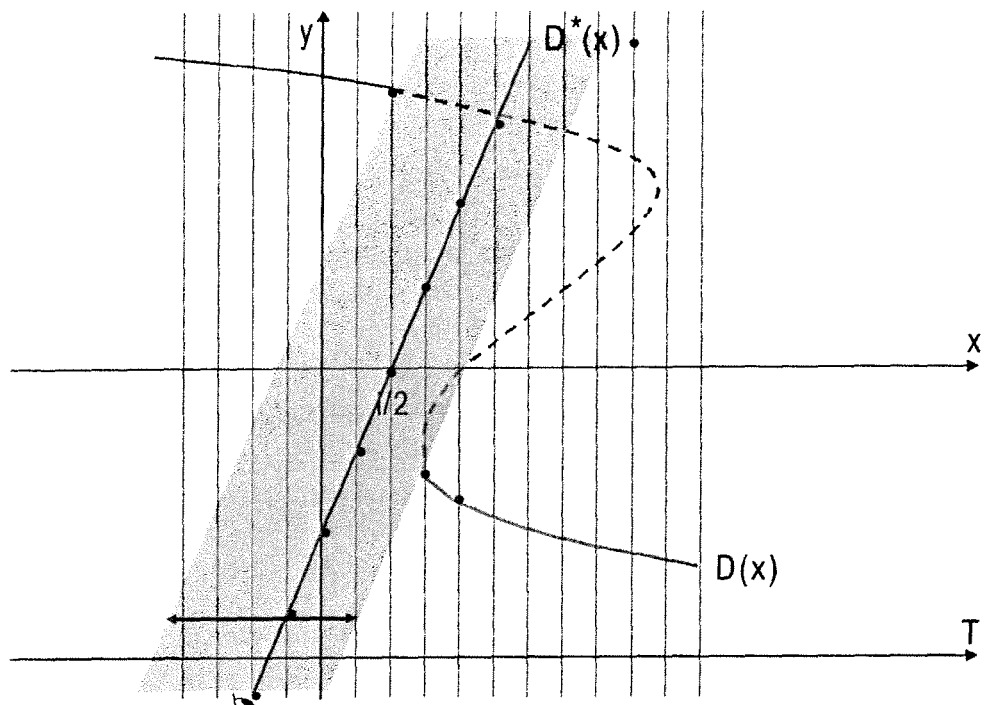
Figure 17:
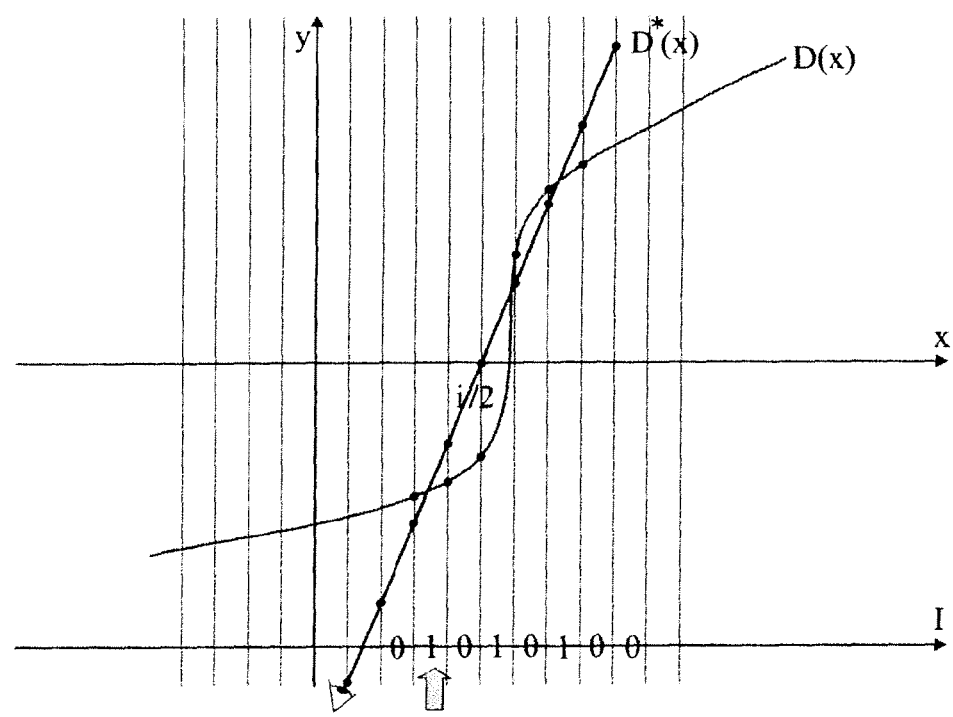

FIGS. 15-17 illustrate the comparison of the potential depth value and the actual depth value.

Since the texture and depth values are discrete sets, a detected intersection can be either a real intersection with the texture either a gap (de-occlusion). While FIG. 15 shows the regular case of real intersection, FIG. 16 shows a de-occlusion case. In FIG. 16, the dashed line represents the hidden depth information not stored in the texture map.

FIG. 17 shows an angle of view that may intercept the texture map at several points (multiple occlusions case), the colour for abscissa x should be the colour of the texture at the nearest intersection from the observer.

Several comparison criteria may be defined. For example, it may be determined whether the potential depth value is strictly equal to the actual depth value. It may also be determined whether the potential depth value is equal to the actual depth value taking into account a margin. Other criteria may be defined.

In the present example, if the potential depth value is not equal to the actual depth value, the process goes to step T507.

In step T507, it is determined whether there are other pixels in the set of pixel candidates. If there are other pixels in the set of pixel candidates, the process goes back to step S504 for selecting another current pixel candidate in the set of pixel candidates. If there is no pixel left in the set of pixel candidates, the process goes to step T509.

In step T509, it is determined whether there are other pixels to explore in the image view. If there are other pixels to explore in the image view, the process goes back to step S502 for selecting another current pixel in the image view. If there is no pixel left in the image view, the process goes to step S510.

Step 510 may be a termination step for outputting the image view, or a further processing step for adapting the image view to a particular format or performing an image correction.

Back to step T506, if the potential depth value is equal to the actual depth value, the process goes to step S508.

During step 508, the texture value associated with the current pixel candidate (the one for which the potential depth value has been calculated), is copied in the texture map associated with the image view in order to be assigned to the current pixel.

Then, the process goes to step T509.

Other embodiments handle the case where there are several pixels in the set of pixel candidates for which the potential depth value is equal to the actual depth value. This case is called an occlusion case.

Figure 6:
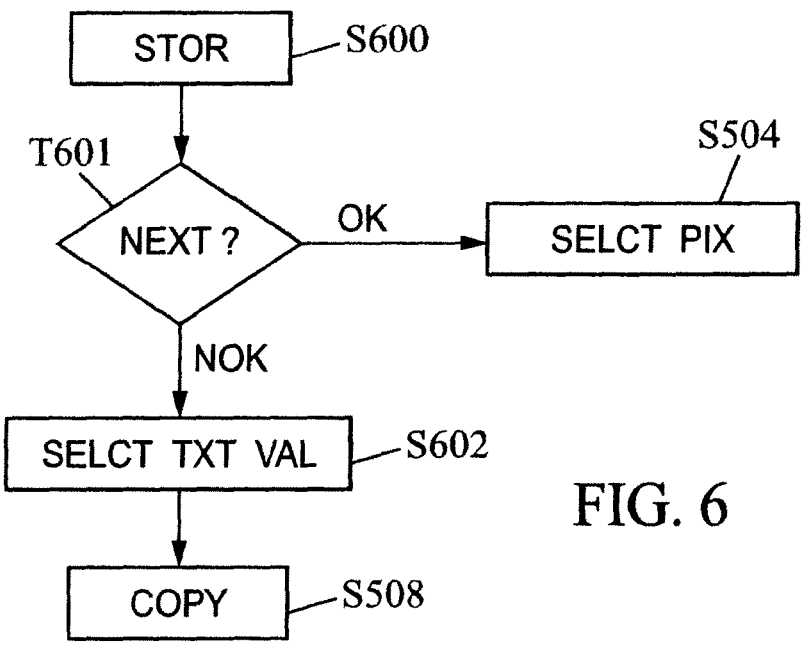

These embodiments may have the following steps, described with reference to FIG. 6, performed after step T506 and before step S508.

When the potential depth value calculated during step S505 is determined to be equal to the actual depth value in step T506, the process goes to step S600 wherein the texture value associated with the current pixel candidate (the one for which the potential depth value has been calculated) is stored in a memory.

Then, the process goes to step T601. In step T601, it is determined whether there are other pixels in the set of pixel candidates. If there are other pixels in the set of pixel candidates, the process goes back to step S504 for selecting another current pixel candidate in the set of pixel candidates. If there is no pixel left in the set of pixel candidates, the process goes to step S602.

In step S602, a texture value amongst those stored in memory during the different iterations of step S600 is selected.

The selection of the texture value may be performed as follows.

A binary word C (or codeword) is built which has for each abscissa of the set of pixel candidates 42 a bit set to one if there is a pixel at that abscissa which has a potential depth value equal to its actual depth value, or else a bit set to 0. The other way around may also be envisaged. For example, 0 might represent equal depth values and 1 might represent in-equality.

In general, when it is said in this description that a bit being equal to 0 represents a first fact and that that a bit being equal to 1 represents a second fact, it is noted that in other embodiments the roles of the bits 0 and 1 may be interchanged. Similarly, when it is said in this description that values are larger or smaller than a threshold, it is noted that in other embodiments the roles of the value falling on respective sides of the threshold may be interchanged.

The texture value selected during step S602 is the one associated with the pixel having an abscissa corresponding to the first or the last non zero bit of the binary word C (in the reading direction of the codeword, here from left to right).

The binary word is illustrated in FIG. 17, wherein several intersections occur. Two bits are set to 1 when an intersection occurs, the other bits are set to 0.

Indeed, according to the coordinates system X, Y associated with the images, the first non zero bit corresponds to the pixel being the most at the left of the image and the last non zero bit corresponds to the pixel being the most at the right of the image.

If the current image view that is being constructed is intended to be displayed with an angle to the central view so that the image is to the left of the viewer (position of the image view 21 in FIG. 2), then the texture value of the pixel having an abscissa value corresponding to the first non zero bit of the word C is selected.

If the current image view that is being constructed is intended to be displayed with an angle to the central view so that the image is to the right of the viewer (position of the image view 23 in FIG. 2), then the texture value of the pixel having an abscissa value corresponding to the last non zero bit of the word C is selected. An alternative would be to work through the pixel candidates in the appropriate direction (depending if it is a right or left view) and simply take the first pixel that has equal depth values as above (and skip processing of the rest of the pixel candidates). Then, there is no need to go through them all and then choose first or last.

Back to the process described with reference to FIG. 6, once the texture value is selected during step S602, the process goes to step S508 described above for copying the selected texture value to the texture map of the image view.

Other embodiments handle the case where there is no pixel in the set of pixel candidates for which the potential depth value is equal to the actual depth value. This case is called a de-occlusion case.

For example, such a case may be detected by using the binary word C defined above. The detection may comprise the determination of the fact that there is no bit set to 1 in the binary word C.

Figure 7:
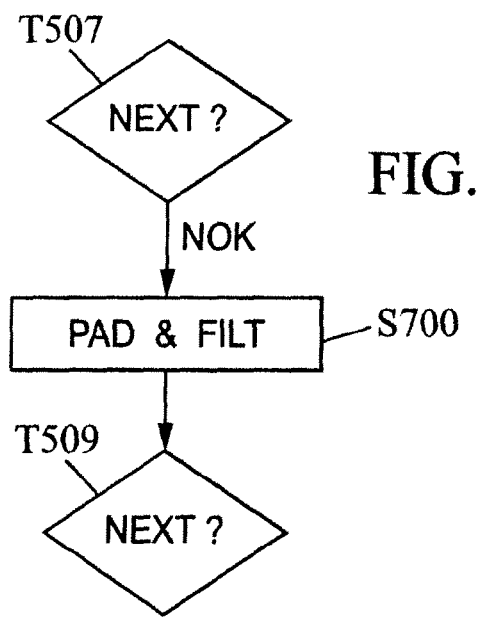

These embodiments may have the following steps, described with reference to FIG. 7, performed after step T507 (in case there is no other pixel in the set of pixel candidates) and before step S509.

For example, a step S700 is performed during which padding and filtering is carried out. Namely, an average texture is determined on the pixels surrounding the pixel at the current position. Alternatively, the texture value of an adjacent pixel is copied. Any other existing or future suitable technique may be applicable for various embodiments.

It may happen that the depth map comprise only integer values and that the formula for determining the potential depth value described above gives non integer potential depth values. In such cases, there may be cases where a potential depth value equal to the actual depth value cannot be found.

Figure 8:
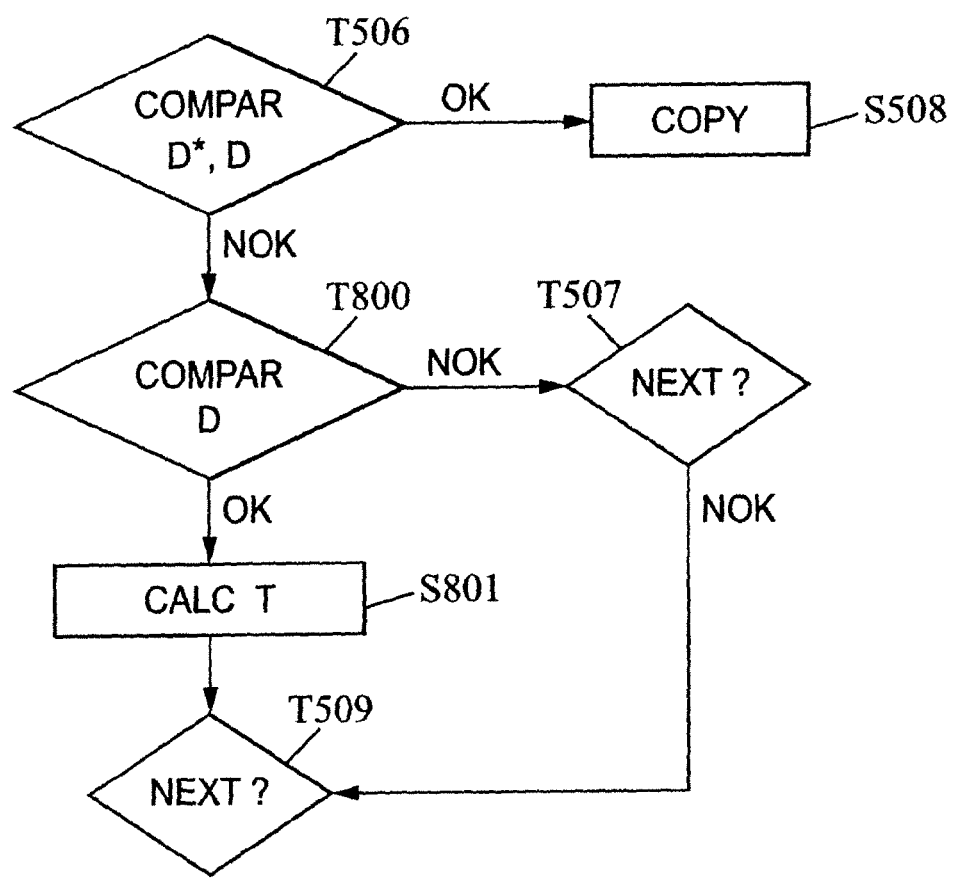

In order to avoid such a situation, embodiments have the following step T800, described with reference to FIG. 8, performed after step T506 and before step S508 (and before S600 of FIG. 6 if applicable).

In step T800, the disparity value of the current pixel in the input image is compared to the disparity value of at least one of the adjacent pixels. If the absolute difference between these two disparity values is inferior to a threshold, then no adjacent pixel has a disparity value suitable for determining the texture value of the current pixel in the image view. The process then goes to step T507 for determining whether there are other pixels in the set of pixel candidates as discussed above. If the difference is greater than or equal to the threshold, it means that there is at least one adjacent pixel which has a disparity value suitable for determining the texture value of the current pixel in the image view. The process then goes to step S801 wherein the texture value for the current pixel in the image view is calculated, based on the texture values of the current pixel candidates and the adjacent pixel.

Figure 9:
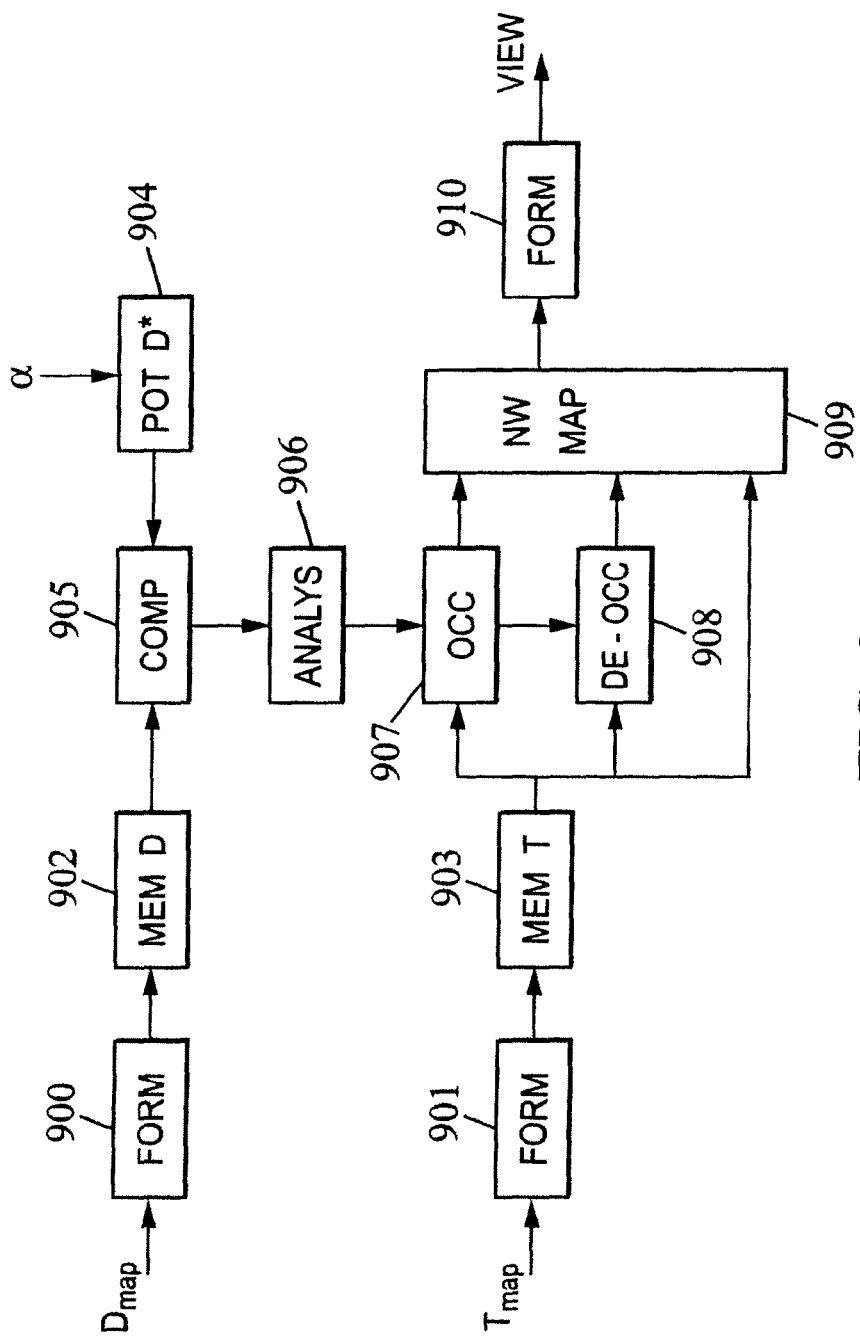
FIGS. 9-11 are schematic illustrations of system and hardware embodiments.

A hardware embodiment is described hereafter with reference to FIG. 9.

The system of FIG. 9 may be comprised in a 3D television or another image processing device such as stereoscopic displays, mobile phones, PDA's, game consoles, DVD players.

The system receives (during step S500) as an input a depth map Dmap and a texture map Tmap associated with an input image. The maps are received through respective formatting modules 900 and 901 that are intended to put the data contained in the maps in a format suitable for the processing by the system.

The system comprises a memory 902 for storing (during step S501) the formatted depth map, and a memory 903 for storing the formatted texture map. Alternatively, if the depth map and texture map are together (coplanar) and interleaved (d, R, G, B components), modules 900 and 901 may be the same and memories 902 and 903 may be the same.

The system further comprises a potential depth determination module 904, that receives as an input the angle with which a current image view to be built is intended to be displayed with respect to the central view (see FIG. 2) (the angle may also be defined relative to other references such as the display plane). For a current pixel candidate of the input image the potential depth determination module computes the potential depth value, for example, as discussed above with reference to step S505.

The potential depth determination module and the memory 902 are coupled to a comparing module 905 for comparing potential depth values to actual depth value as discussed above with reference to step S506.

The output of the comparing module is fed to an analysis module 906, for determining, based on a result of the comparison performed by the comparing module, whether an occlusion or a de-occlusion is taking place.

The system further comprises an occlusion management module 907 and a de-occlusion management module 908, for handling the occlusion and de-occlusion cases, based on a result of the analysis module. Modules 907 and 908 may be bypassed when there is no occlusion or de-occlusion.

The system further comprises a map generator 909 for generating a texture map for the current image view, based on the texture values of the texture map of the input image (for example during steps S508, S700 or S801 discussed above). The texture maps generated by the texture map generating module are fed to a formatting module 910 for adapting the generated map to a desired format, for example during step S510.

Particular aspects of hardware embodiments are discussed hereafter.

For a current pixel of the image view to be built, when the set of pixel candidates is determined, the system defines a depth vector [D] comprising the depth values of all the pixels in the set of pixel candidates (the range in relation to the current pixel may also be determined once and for all and not related to each current set of pixel candidate). For example, the depth vector is defined as follows:

$$[D]=[Dx(-d_{max}), Dx(-d_{max}+1), \ldots Dx(-1), Dx(0), Dx(1), \ldots, Dx(d_{max}+1)].$$

The notation $Dx(k)$ represents the depth value from the depth map of the pixel at position k with respect to the current pixel. The value $d_{max}$ being the maximum disparity value computable, given the angle of display of the image view, and the maximum depth value in the depth map, as already discussed here above.

The disparity vector may be defined by the formatting module 900 or another module not drawn in FIG. 9.

The system may also determine a potential depth vector [D*] comprising the potential depth values for all the pixels in the set of pixel candidates. For example, the potential depth vector is defined as follows:

$$[D^*]=[D^*x(-d_{max}), D^*x(-d_{max}+1), \ldots D^*x(-1), D^*x(0), D^*x(1), \ldots, D^*x(d_{max})].$$

The notation $D^*x(k)$ represents the potential depth value of the pixel at position k with respect to the current pixel. The potential depth values may be computed as already discussed above. The representation above may also be determined once and for all.

The potential disparity vector may be defined by the potential depth determination module 904.

The comparing module may receive as inputs from the memory 902 and the potential depth determination module 904, the depth vector and the potential depth vector.

Figure 13:
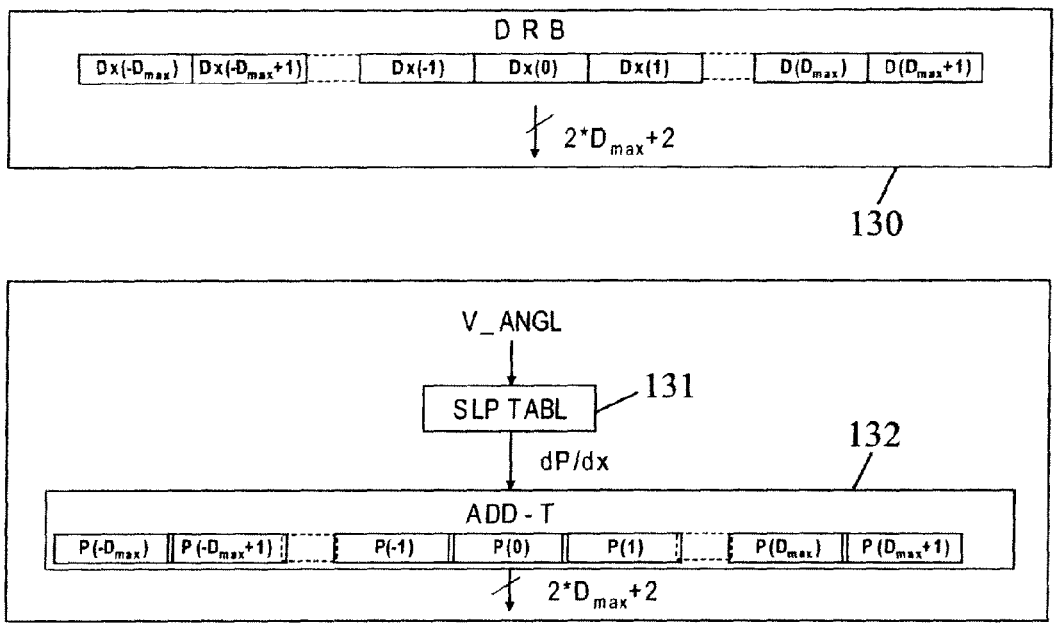
FIG. 13 is schematic illustration of a hardware module in charge of comparing potential depth values to actual depth values according to embodiments.

For example, the comparing module 905 is designed according to the schematic illustration of FIG. 13.

The module can store the overall range of depth values (disparities) for a given x abscissa in a Disparity Register Bank DRB 130 containing (2Dmax+2) depth words of the current set of pixels candidates Sx. All the words of this register file may be accessible in parallel in order to compute all the potential depth values for the current abscissa. Updates of this register bank can be made by a simple shift, as the next set of pixel candidates Sx+1 needed for the following abscissa shares (2Dmax) data with the current set.

Whatever the selected x, the individual data of the Disparity Register Bank are named:

$$\{Dx(-Dmax), Dx(-Dxmax+1), \ldots Dx(-1), Dx(0), Dx(1), \ldots, Dx(Dmax+1)\}.$$

Due to the limited number of view angles V_ANGL, the slope dP/dx of the associated to a view can be tabulated and stored into a ROM SLP TABL 131. The set of potential depth values D*x is:

$$\{-(Dmax)^*dP/dx, (-Dmax+1)^*dP/dx, \ldots, -dP/dx, 0, dP/dx, \ldots (Dmax+1)^*dP/dx\}.$$

The parallel computation of theses values can be done by a simple logarithmic Tree of Adders ADD_T 132. The output values of the tree are named:

$$\{P(-Dmax), P(-Dmax+1), \ldots, P(-1), P(0), P(1), \ldots P(Dmax+1)\}.$$

A set of (2Dmax+1) CrossComp blocks is used to detect the potential intersection and de-occlusion at each position. Each CrossComp bloc output one bit of the Cross(i) word. Only simples operations like subs traction and boolean logic are needed.

Figure 10:
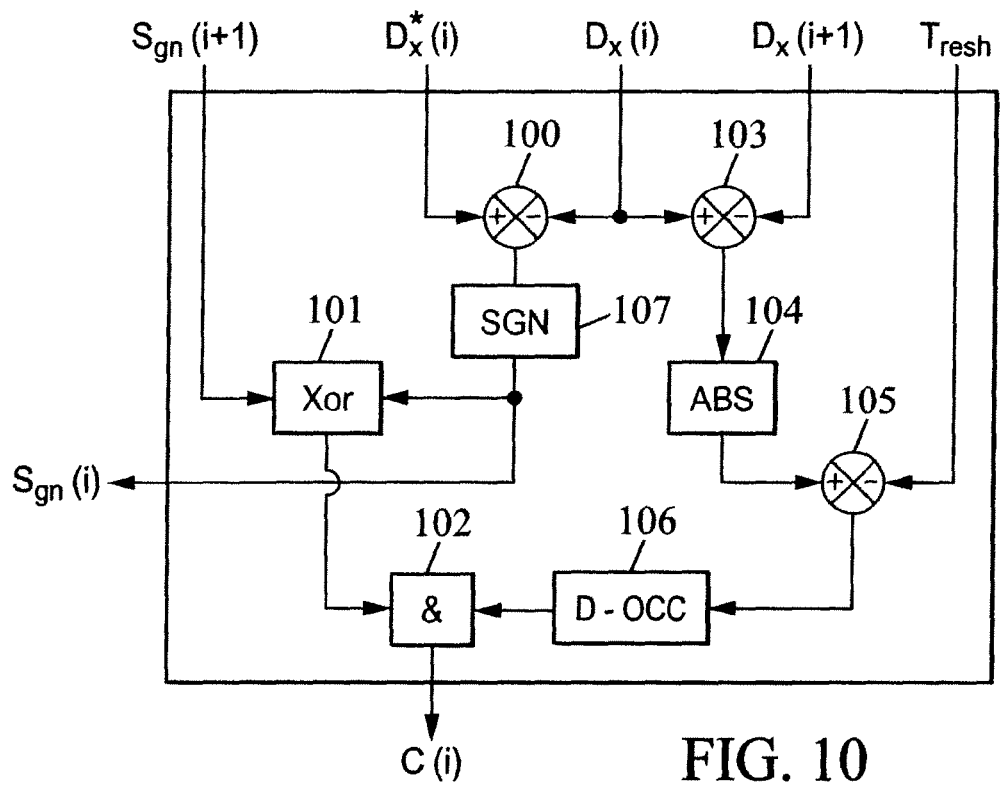

For example, a hardware implementation of the comparing module comprises a cascade of sub-modules as shown in FIG. 10.

The sub-module of FIG. 10 receives as an input a potential depth value $D^*x(i)$ of the potential depth vector, depth values $Dx(i)$ and $Dx(i+1)$ of the depth vector, a gap threshold Tresh, and a bit $Sgn(i+1)$ received from another sub-module, representing the difference between the depth value $Dx(i+1)$ and the potential depth value $D^*x(i+1)$.

The sub-module comprises a comparator 100 for comparing the difference between the depth value $Dx(i)$ and the potential depth value $D^*x(i)$ and outputting the difference to a module 107 that outputs a bit $Sgn(i)$ set to 1 if the difference is positive and set to 0 is the difference is null or negative (one may envisage the other way around). The bit $Sgn(i)$ is then outputted to another sub-module of the comparator, and to an X-or module 101 for performing an "exclusive or" operation on the $Sgn(i)$ and $Sgn(i+1)$ bits.

The output of the X-or module is then fed to a module 102 performing an "and" operation. The output of the X-or module 101 represents the change of the sign of the difference between the potential depth value and the actual depth value for two adjacent pixels candidates. If the sign changes between two adjacent pixel candidates, the system can deduce that an extrapolated potential depth value can be found that is equal to an extrapolated actual as shown hereafter.

The sub-module further comprises a comparator 103 for comparing the depth values $Dx(i)$ and $Dx(i+1)$ of the depth vector, and outputting the difference to a module 104 that calculates the absolute value of this difference.

The module 104 then feeds the absolute value of the difference to a comparator 105 for comparing the absolute value of the difference to the threshold Tresh.

The output of the comparator 105 is fed to a module 106 that outputs a bit set to 1 when the output of module 104 is greater than the threshold), and a bit set to 0 in the other case.

The comparators 103, 105 and the modules 104, 106 perform a de-occlusion detection as described above with reference to FIG. 8.

The output of the module 106 is fed to the module 102, which outputs a bit C(i), used for defining the binary word discussed above.

The detection of the first (or last) non zero bit of the binary word C may be performed, for example, using any implementation of a combinational Leading One Detector (LOD) or Leading Zero Detector (LZD) typically used in floating point hardware modules. If at least one bit of the binary word C is not zero, then the LOD gives the index $i_{select}$ ($i_{select}$ being between $-d_{max}$ and $d_{max}$) of the left most of these bits.

For example, the detection is performed in the analysis module 906.

If an index $i_{select}$ is selected, the following processing may be performed in the de-occlusion management module 908.

A combinational barrel-shifter may be used to select $D^*x(i_{select})$, $D^*x(i_{select}+1)$ in $D^*x[\ldots]$ and $Dx(i_{select})$, $Dx(i_{selected}+1)$ in $Dx[\ldots]$.

Then, a weighting value $W(i_{select})$ is computed for determining the texture value to assign to the pixel of the image view:

$$W(i_{select}) = \frac{1}{1 + \frac{|D^*x(i_{select}+1) - Dx(i_{select}+1)|}{|D^*x(i_{select}) - Dx(i_{select})|}}.$$

Figure 14:
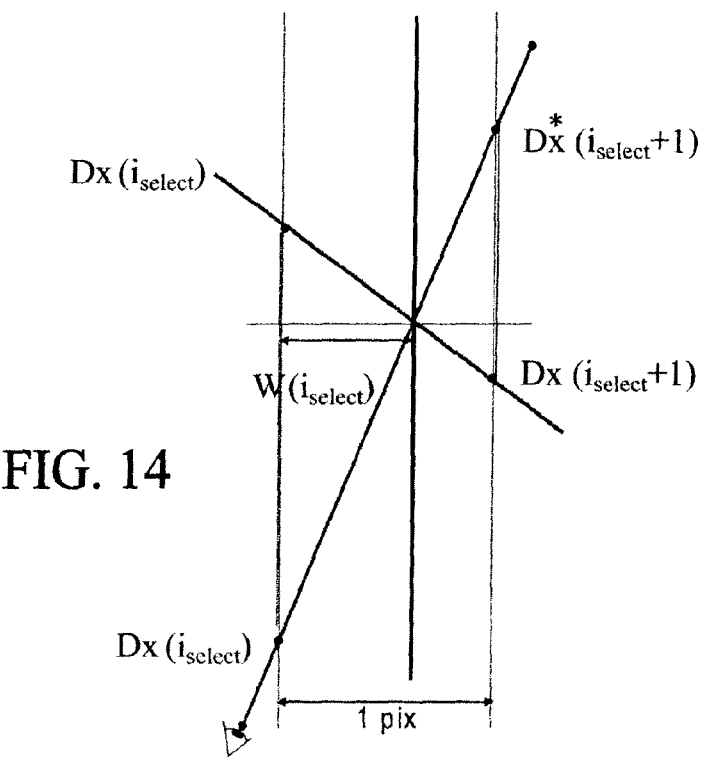
FIG. 14 is a schematic illustration of the determination of a weighting value according to embodiments, and FIGS. 15-17 respectively illustrate examples of regular, de-occlusion and multiple occlusions cases.

As illustrated by FIG. 14, this weighting value gives an interpolation factor for selecting a texture value colour filtering between the texture values of two adjacent pixels. The texture value T selected is then:

$T = T(i_{select})(1 - W(i_{select})) + T(i_{selected}+1)W(i_{select})$, where $T(k)$ represents the texture value of the pixel at position k.

This interpolation factor needs only few bits (4 or 5 in typical applications). Hence, its value can be computed without complex hardware.

The analysis module 906 may also detect that the binary word C is all zeros.

This case corresponds to a total de-occlusion case. This case can be managed by the de-occlusion management module 908, with common techniques appearing to the person with ordinary skill in the art such as padding, local interpolations etc.

In embodiments of the system, there is no computational loop. Hence, the system can be fully pipelined in order to meet timing requirements (one output pixel for one input pixel).

Figure 11:
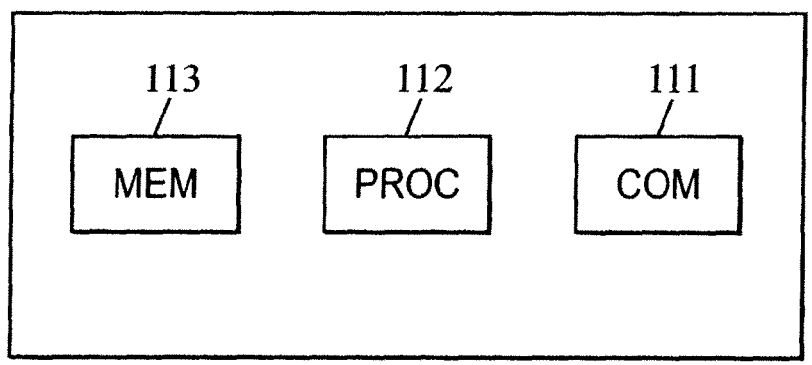

FIG. 11 shows a more general architecture for a device according to embodiments.

The device comprises a communication unit COM 111 for receiving image data to be processed for outputting image views. The device also comprises a control unit PROC 112 for implementing a method according to embodiments of the invention. The control unit may comprise a circuit configured to implement a method according to embodiments. The device comprises a memory unit MEM 113. The memory unit may comprise several types of memory. For example, the memory unit may comprise a memory for storing processing data. The memory unit may also comprise a memory for storing a computer program according to embodiments of the invention. In alternative embodiments, the image is already in the memory 113. In such alternative embodiments, the communication unit 111 may be omitted.

Figure 12:
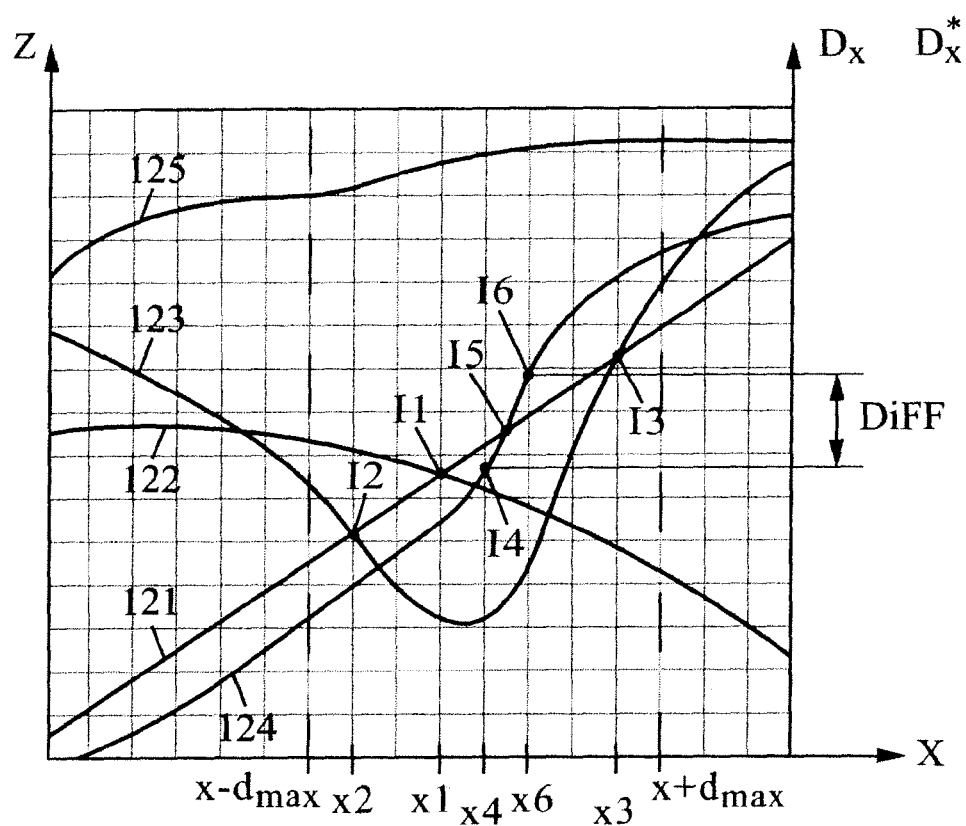
FIG. 12 is a schematic illustration of different cases of occlusion and de-occlusion

FIG. 12 illustrates the different cases discussed here above, namely the occlusion case and the de-occlusion case and typical case. FIG. 12 represents an image view superimposed on the input image. The associated coordinates system is represented by the X and Z axis. On the right side of the Figure there is also represented an axis that shows depth and potential depth values. The grid shows the position of each pixel in the images. The set of pixel candidates is represented by the area comprised between abscissas $x-d_{max}$ and $x+d_{max}$.

The curve 121 shows the potential depth values calculated from depth maps. Curves 122, 123, 124, 125 show the actual depth values associated with each pixel at the corresponding abscissa A typical case is the one with the curve 122. One can see that curve 122 intersects curve 121 at a single point 11 at a position x1 of the grid. It corresponds to the case where there is a current pixel candidate which has a depth value equal to the associated potential depth value.

An occlusion case is illustrated with curve 123. One can see that curve 123 intersects curve 121 at two points 12 and 13 at positions x2 and x3 of the grid. It corresponds to the case where there are two current pixel candidates that have a depth value equal to the associated potential depth value. In this case, a selection is performed as discussed above.

A total de-occlusion case is illustrated with curve 125. One can see that curve 125 never intersects curve 121. It corresponds to the case where there is no current pixel candidate that has a depth value equal to the associated potential depth value. An image processing for handling this case is thus needed as already discussed above.

A false de-occlusion case is also illustrated with curve 124. One can see that curve 124 intersects curve 121 at a point 15 which does not exist on the grid. It corresponds to the case where there is no current pixel candidate that has a depth value equal to the associated potential depth value because of the rounding of the values (consider that the curves are discretized on the grid). In this case, as already discussed above, the difference DiFF between the depth values of the adjacent pixels 14 and 16 is compared to a threshold, in order to compute a value to assign to the pixel in the image view (for example by interpolation of by taking one of the neighbor values).

Embodiments can also be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after either or both of the following a) conversion to another language. Such a computer program can be designed, for example, based on the flowcharts of FIGS. 5-8 and the present description. The computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

The invention claimed is:

1. A method for generating an image view from at least one input image for three dimensional (3D) display, each input image being associated with a texture map and a depth map, the image view being generated at least based on the texture map and the depth map associated with the input image, each pixel of the input image being associated with a texture value of the texture map and with a depth value of the depth map, and an associating function associating pixels of the input image to pixels of the image view, the associating function having at least the depth value of the pixel of the input image as a first parameter, the method comprising:
   for each current pixel in the image view to be generated, defining a set of pixel candidates in the input image, the set of pixel candidates including pixel candidates associated with the current pixel of the image view through the associating function, and
   for at least one current pixel candidate of the set of pixel candidates:
      calculating a potential depth value (D*) which the associating function associates with the current pixel candidate,
      comparing the calculated potential depth value (D*) to an actual depth value (D) associated with the current pixel candidate,
      associating a texture value to the current pixel of the image view, based on a result of the comparison, said texture value being based on the texture value of the current pixel candidate, wherein the associating function has as a second parameter, an angle of view with which the image view is intended to be displayed, and wherein the set of pixel candidates is defined using the second parameter, and
      handling occlusion and de-occlusion cases based on a result of comparing the potential depth value (D*) to the actual depth value (D).

2. The method according to claim 1, wherein the set of pixel candidates is defined using a range within which the depth values in the depth map of the input image are comprised.

3. The method according to claim 1, wherein positions of the pixels in the input image and the image view are defined via a coordinate system in which an abscissa axis is parallel to a horizontal direction, the method further comprising:
   if a same potential depth value (D*) is determined to be equal to the actual depth value of several pixels of the set of pixel candidates, selecting a pixel from the said several pixels located at a position which has the least or the greatest abscissa, depending on an intended orientation of the image view with respect of the input image on the 3D display.

4. The method according to claim 3,
   wherein a codeword is defined to have a bit for each abscissa of the set of pixel candidates, the bit being set to a given value if a pixel at that abscissa has a potential depth value equal to its actual depth value, or else the bit being set to the complementary value of said given value, and
   wherein the pixel corresponding to a first bit set to said given value in the codeword, or a last bit set to said given value in the codeword is selected, depending on an intended orientation of the image view with respect of the input image on the 3D display.

5. The method according to claim 1, wherein the associating of the texture value to the current pixel of the image view comprises:
   determining a first sign of a first difference between the actual depth value and the potential depth value, for a current pixel candidate in the set of pixel candidates,
   determining a second sign of a second difference between the actual depth value and the potential depth value, for a pixel adjacent to the current pixel candidate,
   comparing the first and second signs,
   determining a third difference between the actual depth value of the current pixel and the actual depth value of the pixel adjacent to the current pixel candidate,
   comparing the absolute value of said third difference with a threshold, and
   calculating an interpolated texture value based on texture values of the current pixel candidate and of the adjacent pixel, when the first and second signs are different and the absolute value of said third difference is below the threshold.

6. A non-transitory computer readable medium storing a computer program comprising program instructions, the computer program being loadable into a data-processing unit and adapted to cause the data-processing unit to execute a method for generating an image view from at least one input image for three dimensional (3D) display, when the computer program is run by the data-processing unit, each input image being associated with a texture map and a depth map, the image view being generated at least based on the texture map and the depth map associated with the input image, each pixel of the input image being associated with a texture value of the texture map and with a depth value of the depth map, and an associating function associating pixels of the input image to pixels of the image view, the associating function having at least the depth value of the pixel of the input image as a first parameter, the method comprising:
   for each current pixel in the image view to be generated, defining a set of pixel candidates in the input image, the set of pixel candidates including pixel candidates associated with the current pixel of the image view through the associating function; and
   for at least one current pixel candidate of the set of pixel candidates:
      calculating a potential depth value (D*) which the associating function associates with the current pixel candidate,
      comparing the calculated potential depth value (D*) to an actual depth value (D) associated with the current pixel candidate,
      associating a texture value to the current pixel of the image view, based on a result of the comparison, said texture value being based on the texture value of the current pixel candidate, wherein the associating function has as a second parameter, an angle of view with which the image view is intended to be displayed, and wherein the set of pixel candidates is defined using the second parameter, and handling occlusion and de-occlusion cases based on a result of comparing the potential depth value (D*) to the actual depth value (D).

7. A device configured to generate at least one image view from at least one input image for three dimensional (3D) display, each input image being associated with a texture map and a depth map, the image view being generated at least based on the texture map and a depth map associated with the input image, each pixel of the input image being associated with a texture value of the texture map and with a depth value of the depth map, and an associating function associating pixels of the input image to pixels of the image view, the associating function having at least the depth value of the pixel of the input image as a first parameter, the device comprising:

a processing unit configured to perform for each current pixel in the image view to be generated:

defining a set of pixel candidates in the input image, the set of pixel candidates including pixel candidates associated with the current pixel of the image view through the associating function, and for at least one current pixel candidate of the set of pixel candidates:

calculating a potential depth value (D*) which the associating function associates with the current pixel candidate, comparing the calculated potential depth value (D*) to an actual depth value (D) associated with the current pixel candidate, associating a texture value to the current pixel of the image view, based on a result of the comparison, said texture value being based on the texture value of the current pixel candidate, wherein the associating function has as a second parameter, an angle of view with which the image view is intended to be displayed, and wherein the set of pixel candidates is defined using the second parameter, and handling occlusion and de-occlusion cases based on a result of comparing the potential depth value (D*) to the actual depth value (D).

8. The device according to claim 7, further comprising a memory for storing the at least one input image and/or a communication unit for receiving the at least one input image.

9. The device according to claim 7, further comprising:

a potential depth determination module for receiving an angle with which a current image view to be built is intended to be displayed with respect to a reference and for computing the potential depth value, a comparing module for comparing a potential depth value to an actual depth value, an analysis module, for determining, based on a comparison result provided by the comparing module, whether an occlusion or a de-occlusion is taking place.

10. The device according to claim 9, further comprising:

an occlusion management module and a de-occlusion management module, for handling the occlusion and de-occlusion cases, respectively, based on a result of the analysis module.

11. The device according to claim 9, wherein the comparing module further comprises a cascade of sub-modules, each sub-module receiving as an input a potential depth value (D*x(i)) of a potential depth vector, depth values (Dx(i)) and (Dx(i+1)) of a depth vector, a gap threshold (Tresh), and a bit (Sgn(i+1)) received from another sub-module, representing the difference between the depth value (Dx(i+1)) and the potential depth value (D*x(i+1)), each sub-module comprising:

a first comparator for comparing the difference between the depth value (Dx(i)) and the potential depth value (D*x(i));

a sign module for receiving the difference from the comparator and for outputting a bit (Sgn(i)) set to 1 if the difference is positive and set to 0 if the difference is null or negative;

an X-or module for performing an exclusive-or operation on the Sgn(i) and Sgn(i+1) bits;

a second comparator for comparing the depth values (Dx(i)) and (Dx(i+1)) of the depth vector;

a third comparator for comparing the absolute value of the difference output by the second comparator to the gap threshold (Tresh);

a de-occlusion module for outputting a bit set to 1 when an absolute value of the difference output by the second comparator is greater than the gap threshold (Tresh), and a bit set to 0 otherwise; and an AND module for performing an AND operation on the output of the X-or module and the output of the de-occlusion module and for outputting a bit (C(i)), used for defining a binary word which has a bit for each abscissa of the set of pixel candidates, the bit being set to a given value if a pixel at that abscissa has a potential depth value equal to its actual depth value, or else the bit being set to a complementary value of said given value.

12. The device according to claim 7, further comprising:

a map generator for generating a texture map for the current image view, based on the texture values of the texture map of the input image, and a formatting module for adapting the generated texture map to a desired format.

13. A display device comprising:

a device configured to generate at least one image view from at least one input image for three dimensional (3D) display, each input image being associated with a texture map and a depth map, the image view being generated at least based on the texture map and a depth map associated with the input image, each pixel of the input image being associated with a texture value of the texture map and with a depth value of the depth map, and an associating function associating pixels of the input image to pixels of the image view, the associating function having at least the depth value of the pixel of the input image as a first parameter, the device including:

a processing unit configured to perform for each current pixel in the image view to be generated:

defining a set of pixel candidates in the input image, the set of pixel candidates including pixel candidates associated with the current pixel of the image view through the associating function, and for at least one current pixel candidate of the set of pixel candidates:

calculating a potential depth value (D*) which the associating function associates with the current pixel candidate, comparing the calculated potential depth value (D*) to an actual depth value (D) associated with the current pixel candidate, associating a texture value to the current pixel of the image view, based on a result of the comparison, said texture value being based on the texture value of the current pixel candidate, wherein the associating function has as a second parameter, an angle of view with which the image view is intended to be displayed, and wherein the set of pixel candidates is defined using the second parameter, and handling occlusion and de-occlusion cases based on a result of comparing the potential depth value (D*) to the actual depth value (D); and a 3D display.

14. An electronic apparatus comprising:

a display device including a device configured to generate at least one image view from at least one input image for three dimensional (3D) display, each input image being associated with a texture map and a depth map, the image view being generated at least based on the texture map and a depth map associated with the input image, each pixel of the input image being associated with a texture value of the texture map and with a depth value of the depth map, and an associating function associating pixels of the input image to pixels of the image view, the associating function having at least the depth value of the pixel of the input image as a first parameter, the display having:

a processing unit configured to perform for each current pixel in the image view to be generated:

defining a set of pixel candidates in the input image, the set of pixel candidates including pixel candidates associated with the current pixel of the image view through the associating function, and for at least one current pixel candidate of the set of pixel candidates:

calculating a potential depth value (D*) which the associating function associates with the current pixel candidate, comparing the calculated potential depth value (D*) to an actual depth value (D) associated with the current pixel candidate, associating a texture value to the current pixel of the image view, based on a result of the comparison, said texture value being based on the texture value of the current pixel candidate, wherein the associating function has as a second parameter, an angle of view with which the image view is intended to be displayed, and wherein the set of pixel candidates is defined using the second parameter, and handling occlusion and de-occlusion cases based on a result of comparing the potential depth value(D*) to the actual depth value (D); and a 3D display.

* * * * *